Jan. 6, 1931.  I. M. EVENSEN  1,787,976
COLLAPSIBLE PONTOON FOR AEROPLANES AND THE LIKE
Original Filed March 16, 1928  2 Sheets-Sheet 1
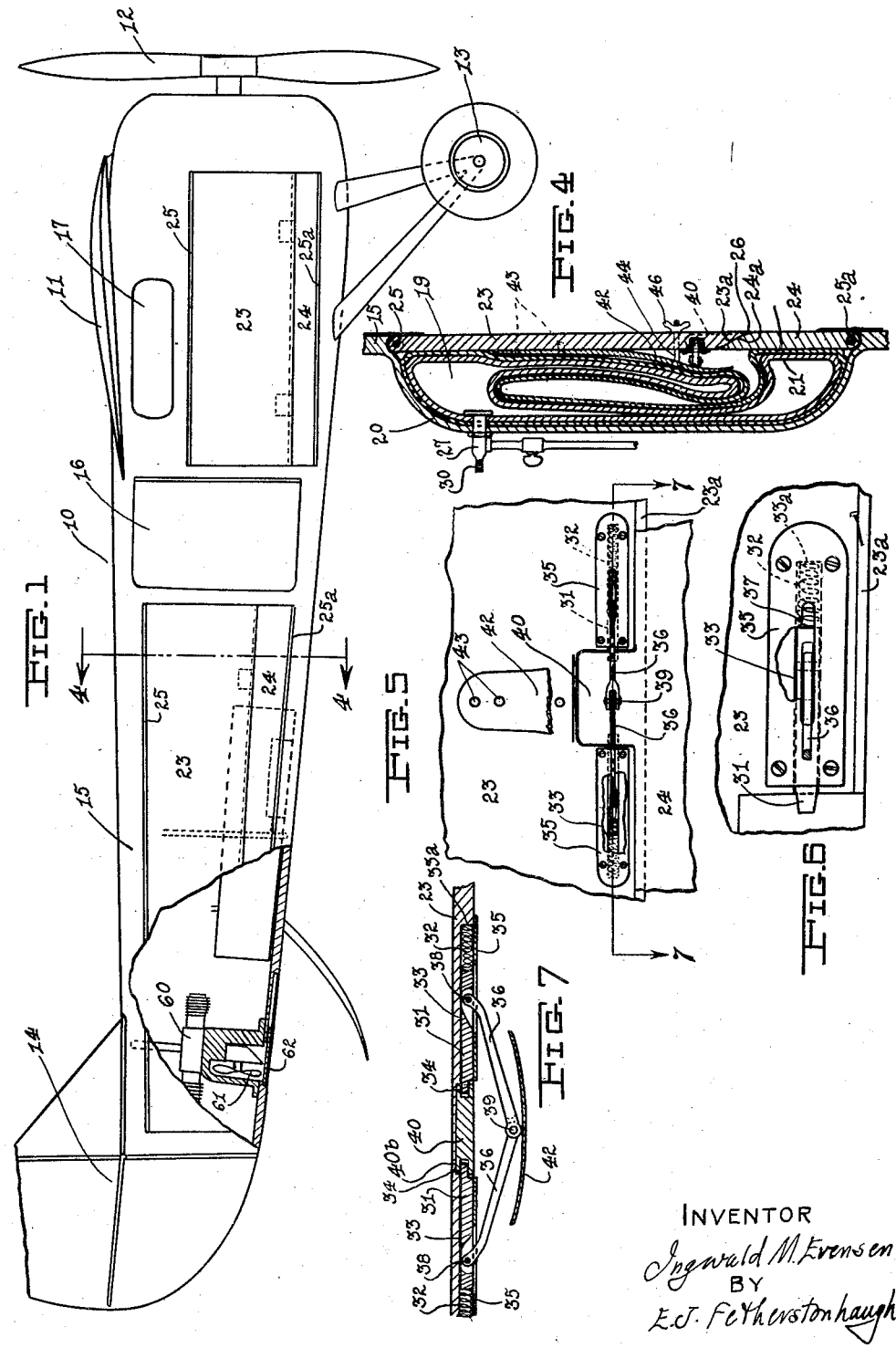
INVENTOR
Ingwald M. Evensen.
BY
E.J. Fetherstonhaugh.

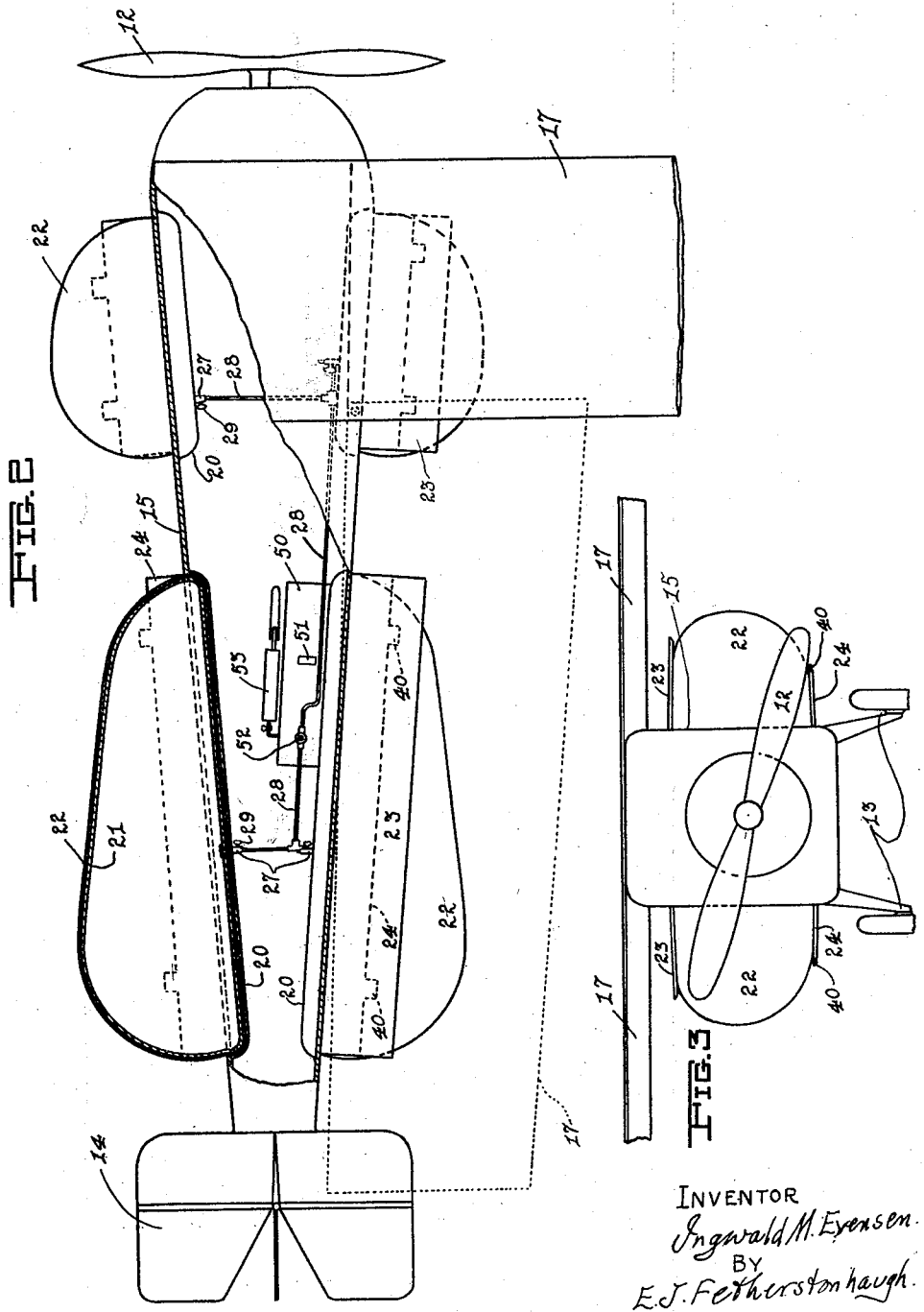

Patented Jan. 6, 1931

1,787,976

UNITED STATES PATENT OFFICE

INGWALD MARTINIUS EVENSEN, OF TORONTO, ONTARIO, CANADA

COLLAPSIBLE PONTOON FOR AEROPLANES AND THE LIKE

Application filed March 16, 1928, Serial No. 262,276. Renewed May 28, 1930.

This invention relates to a system of collapsible pontoons or floats for aeroplanes or the like, as described in the present specification and illustrated in the accompanying drawings which form part of same.

The invention consists essentially of the novel features pointed out broadly and specifically in the claim for novelty following an explanation containing a description in detail of an acceptable form of the invention.

The objects of the invention are to provide emergency means whereby the aeroplane may be kept afloat if for any reason it has been forced to alight on the surface of any body of water over which it may be traveling, and thus greatly reduce the hazard in flying over bodies of water; to construct in an aeroplane means whereby the body of the aeroplane may be used as a boat and to provide means for propulsion of same over the surface of the body of water; and generally, to provide a simple and durable construction requiring little care or skill in operation and capable of accomplishing the aforesaid purposes.

In the drawings, Figure 1 is a side elevational view of a typical aeroplane with parts broken away to disclose the invention.

Figure 2 is a plan view of the machine with parts broken away to disclose parts in section and showing a modified construction.

Figure 3 is a front elevational view of the machine as illustrated in Figure 1.

Figure 4 is a cross sectional view taken on line 4—4 in Figure 1.

Figure 5 is a fragmentary inside view of the automatic locking mechanism used in securing the hinged covers.

Figure 6 is an enlarged fragmentary view of Figure 5.

Figure 7 is a sectional detail on line 7—7 in Figure 5.

Like numerals of reference indicate corresponding parts in the various figures.

Referring to the drawings, 10 is a typical aeroplane having the wings 11, the propeller 12, the landing gear 13 and 13A, the fuselage or body 15 and the rudders and steering apparatus 14. 16 are weatherproof and waterproof doors situated in the side of the fuselage 15 and affording means for the usual entrance in the body of the plane. 17 are the usual windows. Compartments 19 are formed in the sides of the fuselage and each compartment is enclosed on the outer side or the side towards the weather by a pair of doors 23 and 24 hinged at 25 and 25A, respectively. The doors 23 and 24 are adapted to close and form a weatherproof joint along the bevelled edges 23A of the door 23 and 24A of the door 24, as best shown in Figure 4 at 26. The compartment 19 is enclosed on the inner side by the walls 20 formed integral with the sides of the fuselage 15 and curved inwardly as shown in Figure 4. In the compartment 19 is situated an inflatable bag 21 made of rubber similar to that used in automobile tires and a similarly-shaped bag 22 made of rubberized canvas or fabric and affording means of protecting the inner bag 21, said casing and bag taking a shape substantially as shown in Figures 2 and 3 on inflation of the inner bag 21. The bag or casing 22 is secured to the wall 20 by means of cement or other suitable material, and is partially secured to the doors 23 and 24 in a similar manner. The slack portions of said bags 21 and 22 when said bags are deflated are folded up as best shown in Figure 4. The bag 21 may be inflated in a similar manner to that used in inflating automobile tires, that is by means of a valve container 27 sealed to the bag 21 in the usual way and extending through the casing 22 and through the inner wall 20 and exposing the portion 30 onto which the usual air pressure pump may be attached, and the bag 20 inflated by actuating the pump manually. The bags 21 may be deflated by depressing the valve-inside in the valve container 27 or by removing the valve-inside altogether, similar to the manner of deflating automobile tubes.

The doors 23 and 24 are so secured when closed, that when a certain pressure has been reached in the bag 21, said pressure will operate to release the locking mechanism which holds said doors 23 and 24 closed and they will be opened automatically, thus allowing the bags 21 to be fully inflated.

In Figures 5, 6 and 7, the locking means and mechanism for operating same is best shown. 40 are a plurality of projections extending from the bevelled edge 24A of the door 24. The extended portions 40 lie in recesses 40B formed in the door 23 when the doors 23 and 24 are in their closed positions. In the door 23, grooves 33 parallel to the edge 23A are formed and extend on either side of the recess 40B. Bolts 31 are reciprocally mounted in said grooves and are adapted to move towards and into the opening 34 on either side of the extended portion 40 to effectively retain said extended portion 40 in the recess 40B and thus retain the doors in their closed positions. The bolts 31 are retained in the grooves 33 by means of the plate 35 placed over the groove 33 and suitably secured to the door 23 by screws or other suitable means. Springs 32 situated in the groove 33 and impinging against the opposite end of the bolt 31 and against the end of the slot at 33A, tend to retain the bolts in their operative position. In order to withdraw the bolts from the opening 34 to allow the doors to swing open when the bags 21 are inflated, a resilient tongue 42 is secured at one end to the inner side of the door, as at 43, and has its free end raised, as shown in Figure 4. A pair of toggles 36 have one end pivotally secured to the bolts 31, respectively, as at 38, and the other end pivotally hinged on the pin 39. The ends of the toggles 36 which are attached to the bolts 31 are inserted through a slot or opening 37 formed in the plate 35 and are free to reciprocate in said opening 37. Said toggles 36 are so formed that when the bolts 31 are in their operative position, the hinged joint 39 will be some distance from the inner surface of the door 23 and bears against the resilient tongue 42, as best shown in Figures 4 and 7. The casing 22 of the inflatable bags 21 bears against the resilient tongue 42, and when the bag 21 is inflated, pressure will be applied on said resilient tongue 42 and the pivoted joint 39 will be forced towards the doors 23 and 24 and the other ends of the toggles 36 will act on the pin 38 to reciprocate the bolts 31 out of engagement with the openings 34. It will be seen that the door 24 will be released from the door 23 and they will be allowed to swing open.

In order to withdraw the bolts 31 in the slots 33 so that the doors may be closed after deflation of the bags 21 or may be opened without inflating the bags 21, a bolt 44 is secured to the resilient portion of the tongue 42 and reciprocally mounted in the opening 45 in the door 23. A wing nut 46 is threaded thereon. It will be seen that on threading the wing nut 46 onto the bolt 44, said bolt will be tensioned to draw the resilient portion of the tongue 42 towards the door 23 and will thus act on the toggles 36 to withdraw the door 23 and will thus act on the toggles 36 to withdraw the bolts 31 into the slots 33.

In order that the several bags 21 in the different compartments 19 may be inflated simultaneously and quickly in case of emergency, a pressure tank containing air under high pressure may be installed in the fuselage or body of the plane communicating with the several bags and having a shut off valve closing or opening said communications so that, on opening said valve, the air under pressure will force its way into the different bags 21 and inflate them simultaneously and quickly. In Figures 2 and 4 this inflating means is best shown. 50 is a pressure tank having the pressure gauge 51 and the delivery pipes 28 communicating with the different valve containers 27, as best shown in Figure 4. 52 is a shut off valve at the pressure tank and serves to release air under pressure in the tank 50 into the delivery pipes 28 and thus to the different bags 21. An individual valve 29 is situated adjacent the valve stem 27 on the pipe 28 and serves to seal each pipe 28 leading to each inflatable bag 21 so that if the pressure fails in the pressure tank, each bag may be inflated individually, and as stated above, by means of a hand pump being attached to the nipple 30 and operated manually. If it is desired to raise the pressure in the tank 50, a hand pump or compressor 53 is secured to the tank and may be used to increase the pressure in the tank from time to time.

Means for propelling the plane along the surface of the water is shown in Figure 1. 60 is a small auxiliary motor having the propeller 61 which may be lowered below the under surface of the fuselage or body 15 and into the water. Any of the usual propulsion methods used in small motor boats in which a disappearing propeller system is used may be made use of in this case. 62 is a trap door or slide door situated in the floor of the body of the plane and adapted to open to allow the propeller to be lowered into the water and below the floor line of the plane and adapted to be closed when there is no need for the auxiliary propelling system. It will be noted that it is necessary that all joints in connection with the auxiliary propelling system must be waterproof, so that there will be no leakage of water into the body or fuselage 15 when the auxiliary propeller is lowered into the water.

It will also be noted that in place of a single inflatable bag 21 in each of the compartments 19 of the casing 22, a plurality of bags each carrying individual means of inflation may be used without going beyond the scope of this invention. The advantage of this is quite evident, since if one of the inflated bags fail through leakage, its connection may be severed from the main pressure system and one of the other bags be inflated to take its place.

In the operation of this invention, for ordinary flying purposes, the several inflatable bags 21 are deflated and folded in their individual compartments and the enclosing doors 23 and 24 are closed so that a smooth stream line effect is attained on the sides of the fuselage. The pressure in the high pressure tank 50 is of course maintained at all times, but when the bags 21 are deflated, the shut off valve 52 is closed. If for any reason the plane is forced to descend to the surface of a body of water over which it is flying, the shut off valve 52 is opened and the bags 21 are immediately inflated and open the doors 23 and 24 automatically, as explained before, thus affording an efficient system of pontoons to retain the plane on the surface of the water. When it is desired to propel the plane through the water and use it as a boat, the auxiliary motor 60 with its propeller 61 is brought into operation, and thus an efficient means of retaining the plane on the surface of the water and at the same time propelling it from place to place, is provided.

In some planes the wings are so constructed that they are pivoted at their point of attachment to the fuselage of the plane and are so mounted that they may be folded back along the sides of the fuselage or body. This invention may be especially adapted to such form of plane as the wings may be folded back and supported on the several pontoons or inflated bags, as suggested in dotted lines in Figure 2.

What I claim is:

In aeroplane construction, a plurality of compartments in the side walls of the plane body having open ports and inner leakproof walls, co-acting hinged doors secured to the body wall and adapted in their closed position to enclose the compartment open fronts, extensions on said lower doors adapted to be positioned in recesses in said upper doors, bolts reciprocally mounted on said upper doors adapted to engage in openings in said lower door extensions, toggles secured to said bolts, a plate resiliently mounted to said upper door and bearing on said toggles, inflatable bags in said compartments adapted to bear against said resilient plate on inflation and cause the withdrawal of said bolts, and means for inflating and deflating said bags.

Signed at Toronto, Canada, this 16th day of February, 1928.

INGWALD M. EVENSEN.